United States Patent

[111] 3,595,529

| [72] | Inventors | William T. Stull;<br>Earl A. Story, both of Cincinnati, Ohio |
|---|---|---|
| [21] | Appl. No | 861,755 |
| [22] | Filed | Sept. 29, 1969 |
| [45] | Patented | July 27, 1971 |
| [73] | Assignee | Alaskaug, Inc.<br>Cincinnati, Ohio |

[54] PAYOUT ASSEMBLY
7 Claims, 2 Drawing Figs.

| [52] | U.S. Cl. | 254/173,<br>254/190, 303/89, 242/156.2 |
|---|---|---|
| [51] | Int. Cl. | B66d 1/48 |
| [50] | Field of Search | 254/173,<br>190, 192; 188/265, 82.7; 303/89; 242/156, 156.2 |

[56] References Cited

UNITED STATES PATENTS

| 2,163,039 | 6/1939 | Hinricher | 242/156.2 |
| 2,562,990 | 8/1951 | Peebles | 242/156 |
| 2,766,945 | 10/1956 | Reich | 242/156.2 |
| 2,864,469 | 12/1958 | Schlumbrecht | 188/265 |
| 3,172,643 | 3/1965 | Mattingly et al. | 242/156 |
| 3,223,352 | 12/1965 | Fuller et al. | 242/156.2 |
| 3,351,302 | 11/1967 | Lang | 242/156.2 |
| 1,125,107 | 1/1915 | Jacques | 188/82.7 |

FOREIGN PATENTS

| 450,485 | 8/1948 | Canada | 254/190 |

Primary Examiner—Harvey C Hornsby
Assistant Examiner—Merle F Maffei
Attorneys—Alden D Redfield and Gary M. Gron ABSTRACT: The disclosure illustrates a payout assembly for a pilot line that is used to initially span the distance between two spaced positions and to pull a heavier line, such as an electrical conductor, between the positions. The payout assembly comprises a hydraulic vehicle-type brake assembly mounted on a channel-shaped base and adapted to receive a reel having a pilot line coiled on it. A master cylinder assembly, connected to the brake assembly through a locking valve, is actuated by a pivotal arm. The arm is biased to a position wherein the brake assembly is actuated to resist rotation of the reel. The line is trained around a pulley at the free end of the arm so that, only when the line is pulled, the brake assembly is disengaged to permit unreeling of the line. This prevents overrun of the line being pulled from the reel. The pulley and the brake assembly provide rapid and easy installation and removal of the reel.

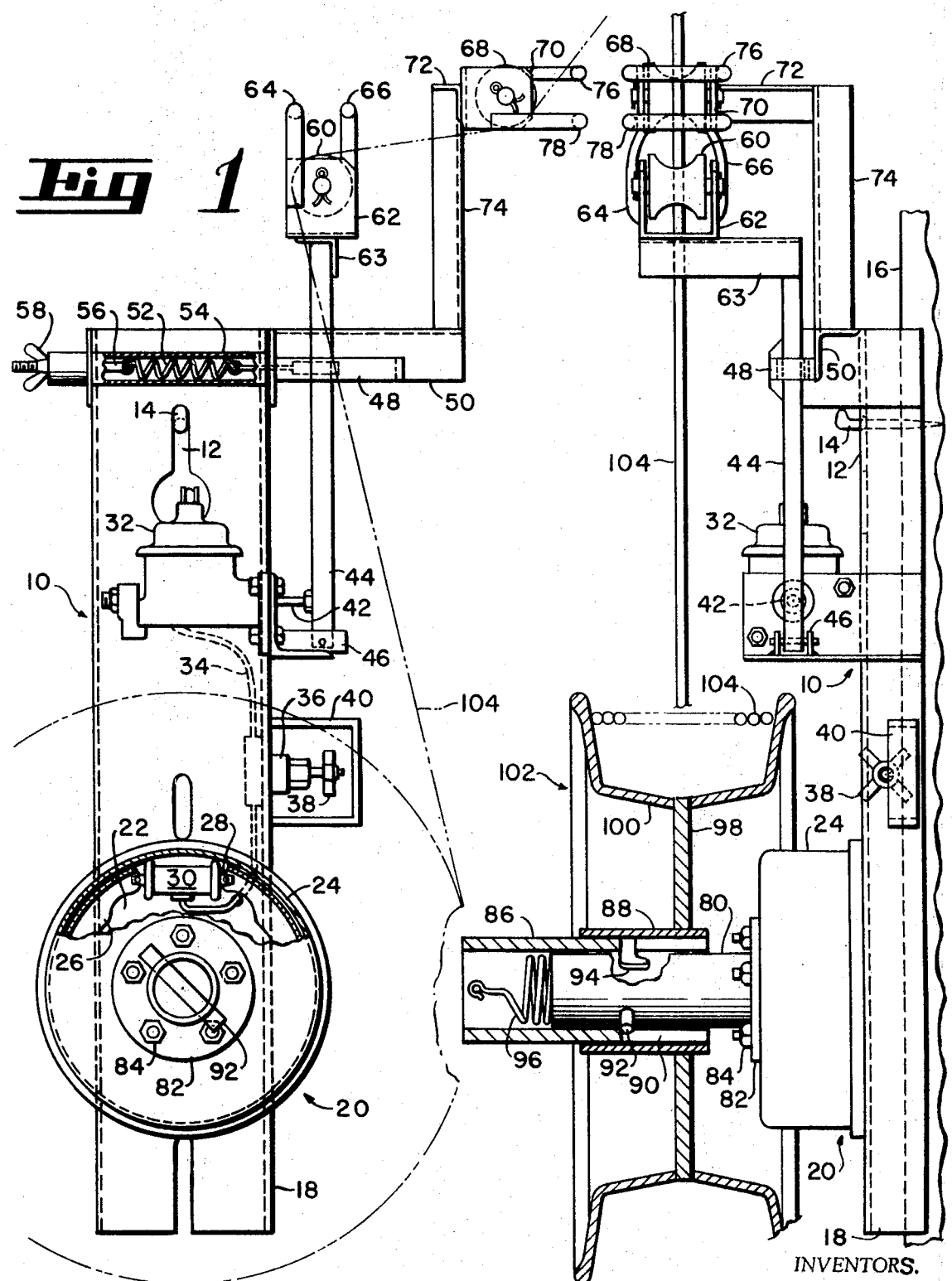

PAYOUT ASSEMBLY

The present invention relates to payout assemblies for reels and more particularly to assemblies of this type which prevent overrun when a coiled line is pulled from the reel.

In recent years the utility industries have adopted a new and more efficient method of stringing heavy electrical conductors between utility poles. Briefly, this method involves the initial stringing of a lightweight flexible line, referred to as a pilot line, over pulleys mounted on the poles. Once the pilot line is extended to the desired length of conductor, a heavier line (called a bull line) is connected to the pilot line and is pulled back over the pulleys through the use of a power winch. The electrical conductor then is connected to the bull line and the bull line reeled in to string the electrical conductor between the utility poles. In some cases the electrical conductor is light enough to be pulled over the pulleys by the pilot line without the need for the intermediate bull line.

With either approach, however, there are problems with respect to the stringing of the pilot line. Usually the pilot line is coiled on a reel and the line is pulled from the reel for the initial stringing. When the reel has been set in motion by pulling the line, the inertia of the reel tends to keep it in motion. As a result, the reel spews out the line even after the pulling has stopped. This problem would prevent the use of a pilot line in many instances where a sagging line would interfere with vehicular or pedestrian traffic.

In the past this problem has been solved by providing a friction brake to constantly retard the rotation of the pilot line reel. This approach has eliminated spewing of line from the reel but it has created a number of new problems. One of these problems is encountered when the pilot line is strung for great distances, for example, up to a half a mile. When the weight of the rope and the friction of the pulleys are added to the constant friction of the brake, the resultant retarding force is greater than the force capable of being exerted by an operator. Other problems posed by devices of this type are high cost and undue complexity.

Accordingly, it is an object of the present invention to provide a simplified, portable and economical payout assembly that enables stringing of line over great distances and prevents spewing of line from the assembly during the stringing operation.

The above ends are achieved by a line payout assembly comprising a hydraulic vehicle-type brake assembly mounted on a base. A shaft extends from the rotatable portion of the brake assembly for removably cantileverally mounting a reel having a line coiled on it. A control means is biased to a first position for actuating the brake assembly to resist rotation of the shaft. The control means is displaceable to a second position in response to pulling of line from the reel mounted on the shaft to permit free rotation of the shaft. As a result, rotation of the shaft is permitted only when the control means is displaced from the first position.

The above and other related objects and features of the present invention will be apparent from a reading of the description of the disclosure found in the accompanying drawing and the novelty thereof pointed out in the appended claims.

In the drawing:

FIG. 1 is a frontal view of a payout assembly embodying the present invention;

FIG. 2 is a side view of the payout assembly of FIG. 1, showing a reel having a line coiled on it mounted on the assembly.

Referring particularly to FIG. 1, the payout assembly comprises a base 10, preferably formed from an elongated channel-shaped member. The base has an elongated slot 12 at its upper end to facilitate hanging the base 10 on a hook or lag screw 14 embedded in a utility pole 16 (see FIG. 2). It should be noted that the sidewalls 18 of the base 10 bear against the curved surface of the utility pole 16 to maintain the base 10 upright on the pole 16.

A vehicle-type hydraulic brake assembly 20 is mounted at the lower end of base 10. The brake assembly 20 may be of a conventional, internal expanding, automotive type, as illustrated, or an automotive disk brake type, or an aircraft type. Each of these types of brake assemblies will be suitable for the payout assembly since they are hydraulically operated and can provide a cantilever mounting for a shaft, as described below.

The brake assembly illustrated comprises a backing plate 22 fixed to the base 10. A drum 24 is suitably journaled relative to the backing plate 22. A pair of shoes 26 are displaced by plungers 28 of a hydraulic wheel cylinder assembly 30 to resist rotation of the drum 24.

The wheel cylinder assembly 30 is fed with hydraulic fluid from a conventional master cylinder assembly 32 via a conduit 34. A shutoff valve 36 is interposed in the conduit between the master cylinder assembly 32 and the wheel cylinder assembly 30. A guard 40 protects a valve stem 38 which is rotated to selectively shut off, or permit, flow of hydraulic fluid through conduit 34.

The master cylinder 32 has a plunger 42 actuated by an arm 44 pivotally mounted on bracket 46 mounted on base 10. The free end of arm 44 is received in a guide 48 secured to an arm 50 fixed on base 10. A spring 52, secured to arm 44, extends through a tube 54 to a bolt 56. A wing nut 58 is threaded on the end of bolt 56 and abuts tube 54. The tension of spring 52 is adjusted by manipulating wing nut 58. The spring 52 yieldably biases the arm 44 toward a position wherein brake assembly 20 is engaged.

A pulley 60 is journaled in plates 62 extending from a bracket 63, secured to the free end of arm 44. A pair of L-shaped guide rods 64, 66 are mounted on opposite plates 62. Their free ends extend inward, generally parallel to the axis of rotation of pulley 60. The rods 64, 66 are offset relative to one another to facilitate the rapid training of a line over the pulley 60 and its equally rapid removal.

A second pulley 68 is journaled in plates 70, extending from arms 72, 74 that are secured to base 10. A pair of L-shaped rods 76, 78 extend from plates 70 in a fashion similar to guide rods 64 and 66 to facilitate rapid training of a line around pulley 68.

A shaft 80, having a flange 82, is cantileverly mounted against the drum 24 by bolts 84. A hub, comprising welded inner and outer sleeves 86, 88, respectively, is adapted to be telescoped over shaft 80. A pair of longitudinal slots 90 receive the ends of a radially extending rod 92 to permit relative axial movement but prevent relative rotational movement. Suitable detents 94 at the inner ends of slots 90 enable the ends of rod 92 to be locked in the detents 94 by a slight twisting motion. A spring 96, locked in the end of sleeve 86, acts on the end of shaft 80 to yieldably maintain the rod 92 in detents 94.

A web 98 is welded to the hub and extends to an outer rim 100 to form a reel assembly 102 that has a line, such as a lightweight nylon pilot line 104, coiled on it.

The payout assembly is used by positioning it on the lag screw 14 secured to the utility pole 16. The reel assembly 102 is removably telescoped over shaft 80 which provides a rotatable cantilever mounting. The line 104 is trained over pulley 60 at the end of pivotal arm 44. The line 104 may then be extended directly to an operator for unreeling or may be trained around pulley 68 to a suitable fixed pulley (not shown) at an elevated point on the pole 16 and then to an operator.

In either case, pulling of the line 104 from the reel assembly 102 causes the free end of arm 44 to swing against the action of spring 52 and disengage brake assembly 20. The operator then pulls the line 104 from reel assembly 102 with a minimum resistance. Any tendency of the reel assembly 102 to spew out the line 104 tends to slacken the line 104 and permit the spring 52 to bias arm 44 to engage the brake assembly 20 and prevent spewing of line. In addition, when the operator stops pulling, the line 104 tends to slacken and the brake assembly 20 is engaged.

The hydraulic vehicle-type brake assembly 20 permits a fine degree of control over the rotation of reel assembly 102. This feature is especially important when the line 104 is strung over great distances, since any slackening of the line may interfere with traffic on the ground. It should be noted that the tension of the spring 52 is adjustable to vary the bias on arm 44. In practice, this adjustment is made so that the weight of the line freely suspended by the payout assembly and by a pulley or the operator is insufficient to pull the arm against the spring 52. This insures that only the pull of the operator will disengage the brake assembly 20 to permit rotation.

The valve 36 provides the payout assembly with a significant advantage for use in the field. Frequently it is necessary to stop a line-stringing operation in the middle because of the end of the work day. The valve 36 enables the brake assembly 20 to be easily and quickly locked in an engaged position to prevent any unreeling of the line 104. This keeps the line taut and out of the way of any traffic on the ground. When line-stringing operations are resumed the valve 36 is merely opened to permit normal functioning of the brake assembly 20. It should be noted that the brake assembly 20 may be locked in a disengaged position by the valve 36, if that condition is desired.

The use of the vehicle-type brake assembly 20 offers a significant advantage because it provides an effective and sturdy cantilever support for the shaft 80 which receives reel assembly 102. This permits rapid installation and removal of the reel assembly 102 from one side while still effectively journaling the reel for free rotation when the brake assembly 20 is disengaged. Also, the provision of means for mounting assembly on firmly fixed point (utility pole) near the ground is greatly advantageous in permitting personnel to operate and service the equipment while standing or moving about on the ground.

It is pointed out that forms of hydraulic vehicle-type brake assemblies other than the one shown may be used with equal advantage because they also provide an effective cantilevered support of a shaft for rotation.

The pulley guide rods enable an easy and rapid installation and removal of line that is trained over the pulleys. This further enhances the rapid stringing of pilot line.

Having described the invention, what I claim as novel and desire to be secured by Letters Patent of the United States is:

We claim:

1. A payout assembly for mounting on a utility pole, said assembly comprising:
   an elongated generally channel-shaped base adapted to be removably mounted on a utility pole parallel to the longitudinal axis thereof;
   a hydraulic vehicle-type brake assembly having a rotatable element, said brake assembly also having a fixed element mounted on the lower end of said base;
   a shaft extending from the rotatable element of said brake for removably cantileverally mounting a reel having a line coiled thereon on said brake assembly;
   a master cylinder assembly mounted on said base and having a conduit for transmitting hydraulic fluid to said brake assembly and having a plunger displaceable between a first position for pressurizing said hydraulic brake assembly to resist rotation of said shaft and a second position where rotation of said shaft is permitted;
   an arm pivotally mounted on said base for directly actuating said plunger, said arm being biased to displace said plunger toward said first position to resist rotation of said shaft, said arm being displaceable away from said plunger in response to pulling of a line from said reel mounted on said shaft and trained over the free end of said arm to permit rotation of said shaft;
   whereby the rotation of said shaft is permitted only when said control means is displaced from said first position.

2. A payout assembly as in claim 1 for use in stringing a pilot line over a predetermined free span and wherein:
   said control means further comprises means for biasing said control arm toward said first position with a given force so that the weight of the line extending over said span is insufficient to displace said control arm from said first position.

3. A payout assembly as in claim 2 wherein said biasing means comprises:
   a spring for yieldably urging the arm to said first position;
   means for adjusting the force of said spring to achieve said given force.

4. A payout assembly as in claim 3 further comprising means for selectively locking said control arm in said first and second position.

5. A payout assembly as in claim 4 wherein
   said locking means comprises a valve assembly interposed in the conduit between said master cylinder assembly and said brake assembly for selectively blocking and permitting flow of hydraulic fluid therebetween.

6. A payout assembly as in claim 1 wherein said control means further comprises:
   a pulley rotatably mounted on the free end of said arm and adapted to have a line coiled on said reel mounted on said shaft trained over the outer end of said pulley;
   a pair of guides for said line comprising a pair of L-shaped rods mounted on said arm adjacent opposite sides of said pulley and having the free ends of said rods extending inward generally parallel to the axis of said pulley and radially spaced therefrom, said rods being offset relative to one another for permitting rapid training of a line over said pulley and rapid removal therefrom.

7. A payout assembly as in claim 1 in combination with a reel, having a line coiled thereon, said reel comprising:
   a hub;
   a flanged drum mounted thereon for receiving said coiled line;
   said hub having a central opening therein and means for removably locking said reel on said shaft when said hub is telescoped thereover.